(12) United States Patent
Shah

(10) Patent No.: US 8,830,193 B2
(45) Date of Patent: Sep. 9, 2014

(54) CONTROLLING VIEWS IN DISPLAY DEVICE WITH TOUCH SCREEN

(75) Inventor: Alap Shah, Maharashtra (IN)

(73) Assignee: Honeywell International Inc., Morristown, NJ (US)

( * ) Notice: Subject to any disclaimer, the term of this patent is extended or adjusted under 35 U.S.C. 154(b) by 283 days.

(21) Appl. No.: 13/403,501

(22) Filed: Feb. 23, 2012

(65) Prior Publication Data

US 2013/0222263 A1 Aug. 29, 2013

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| | | |
|---|---|---|
| 2002/0097322 A1 | 7/2002 | Monroe et al. |
| 2008/0036743 A1 | 2/2008 | Westerman et al. |
| 2008/0165132 A1 * | 7/2008 | Weiss et al. ................... 345/173 |
| 2010/0031344 A1 | 2/2010 | Zhao et al. |
| 2010/0073312 A1 | 3/2010 | Son et al. |
| 2010/0205190 A1 * | 8/2010 | Morris et al. ................. 707/758 |
| 2010/0304731 A1 * | 12/2010 | Bratton et al. ................ 455/420 |

OTHER PUBLICATIONS

European Search Report dated Oct. 10, 2013 and Examination Report dated Nov. 13, 2013.

* cited by examiner

*Primary Examiner* — Nicholas Lee
(74) *Attorney, Agent, or Firm* — Wood, Phillips, Katz, Clark & Mortimer

(57) ABSTRACT

A display device including a display having a touch screen, and a controller for controlling the display to simultaneously provide a selected number of display areas in the display, with each of the display areas being for displaying information from information sources. The controller controls the display to include R display areas when the touch screen is tapped simultaneously R times, and S display areas when the touch screen is tapped simultaneously T times followed by T simultaneous drags on the touch screen, followed by U simultaneous taps on the touch screen, wherein R, S, T and U are integers, R is a selected one of 2, 3 or 4, S>R and T+U=S.

16 Claims, 7 Drawing Sheets

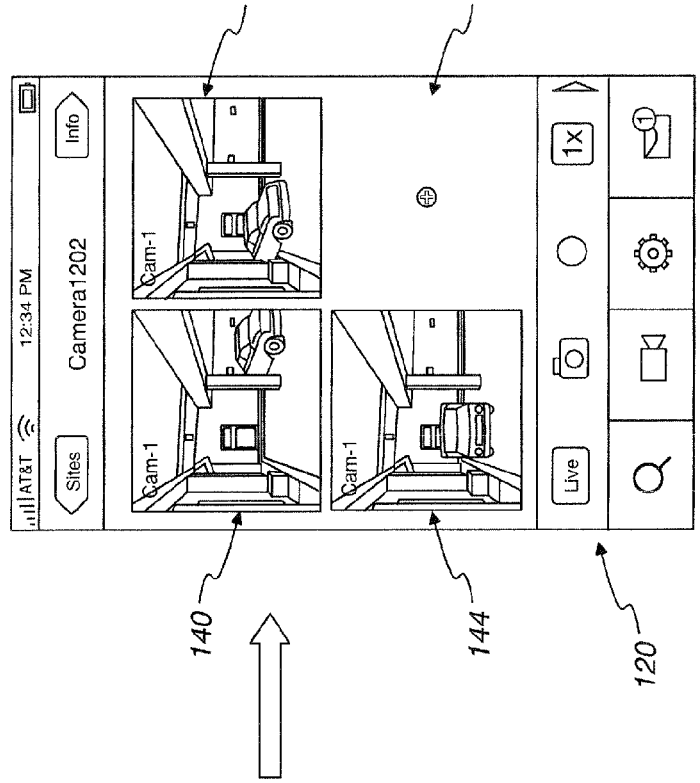
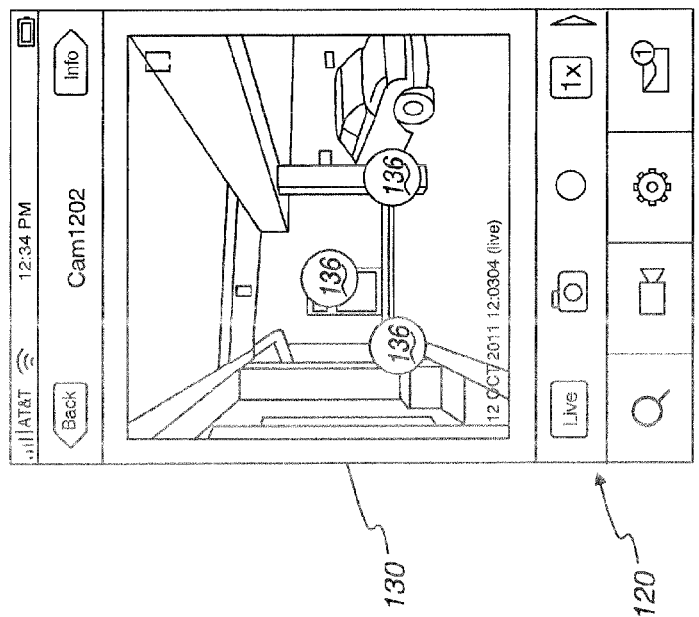
Fig. 3a
Fig. 3b

CONTROLLING VIEWS IN DISPLAY DEVICE WITH TOUCH SCREEN

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD

The present disclosure relates to controlling display devices, and more particularly to controlling display devices having touch screens and a plurality of information sources.

BACKGROUND

Hand held display devices such as smart phones and tablets are widely used for a variety of purposes. With WiFi, 3G, 4G connections and the like, such devices are increasingly used with applications which allow for wireless connection to information sources, including not only broad sources such as the World Wide Web, but also private networks as well.

For example, such display devices have been used by security personnel as they move within a building, with the devices wirelessly receiving remote data such as alarms as well as pictures and/or video from security cameras placed around the area being secured. It should be appreciated that viewing security camera video as a guard moves around a building can not only allow the guard to be able to see potential problems no matter where he is in the building, but it can also allow him to look ahead into areas that he is about to enter to be warned of any potential danger or situation so that he can be prepared and not surprised when entering that area.

It should be appreciated that it is desirable for security personnel to be able to see different camera views as quickly as possible. For example, in some instances it may be desirable to see as many views as possible for a general overview of activity in a building. In other instances, it may be desirable to see just a few views relating to a specific area of concern at that moment. In addition, depending on their eyesight, different security personnel may generally prefer different display area sizes to feel comfortable that they can see what they need to see. Given that the display devices' portability generally restricts the size of the display which the security personnel must look at to receive information, different security personnel may require that different numbers of display areas be provided simultaneously to ensure that the size of each area is appropriate for the person using the device at that time.

While display devices have heretofore allowed security personnel to control the display so that a desired number (and/or size) of display areas will be provided, such switching has required stepping through menu systems. Such menu systems are typically not intuitive, and also can be time consuming and can require the strict attention of the device's user (to make sure the right menu item(s) are found and that they are the one selected [e.g., by touching, as required with typical touch screen displays]), all of which can be a serious problem when, for example, security personnel are under stress and hurried when reacting to a potentially dangerous situation. Further, such menu systems can even occupy area on the display, thereby causing the display areas for camera feeds to be fit into smaller spaces.

The disclosure herein is directed toward solving one or more of the above problems.

SUMMARY

In one aspect of the disclosure, a display device is provided, including a processor for running a program responsive to a numeric input, a display having a touch screen, and a controller for controlling the display to show output from the program. The program runs according to one numeric input responsive to two simultaneous taps on the touch screen, runs according to a second numeric input responsive to three simultaneous taps on the touch screen, and runs according to a third numeric input responsive to four simultaneous taps on the touch screen.

In one form of this aspect, the program generates a display of information from a plurality of sources, with the number of sources displayed corresponding to the numeric input.

In another aspect, a display device is provided including a processor for running a program generating a display of information from a plurality of sources, a display having a touch screen, and a controller for controlling the display. The display is controlled to simultaneously provide a selected number of display areas in the display, each of the display areas for displaying information from the information sources, wherein the controller provides two display areas to the display responsive to two simultaneous taps on the touch screen, the controller provides three display areas to the display responsive to three simultaneous taps on the touch screen, and the controller provides four display areas to the display responsive to four simultaneous taps on the touch screen.

In one form of this aspect, each of the taps is a digit of a display device user contacting the touch screen.

In another form of this aspect, the controller controls the touch screen to provide a single display area for one of the information sources responsive to two consecutive single taps on the touch screen, with the single display area being the only display area for any of the information sources in the display.

In still another form of this aspect, the controller controls the touch screen to provide X display areas responsive to Y simultaneous taps on the touch screen, followed by Y simultaneous drags on the touch screen, followed by Z simultaneous taps on the touch screen, where X=Y+Z. In a further form, Y=3.

In yet another form of this aspect, the information sources are security cameras and the information is video from the cameras. In a further form, the controller provides video from selected cameras to the display.

In another aspect, a display device is provided, including a display having a touch screen, and a controller for controlling the display to simultaneously provide a selected number of display areas in the display, with each of the display areas being for displaying information from information sources. The controller controls the display to include R display areas when the touch screen is tapped simultaneously R times, and S display areas when the touch screen is tapped simultaneously T times followed by T simultaneous drags on the touch screen, followed by U simultaneous taps on the touch screen, wherein R, S, T and U are integers, R is a selected one of 2, 3 or 4, and S>R.

In one form of this aspect, T+U>R. In a further form, T+U=S. In a further form. T=3 and U>1.

In another form of this aspect, the information sources are security cameras and the information is video from the cameras. In a further form, the controller provides video from selected cameras to the display.

In yet another aspect, a display device is provided including a display having a touch screen and a controller. The controller controls the display to simultaneously provide a selected number of display areas in the display, each of the display areas being for displaying video from a selected one of a plurality of remote security cameras. The controller controls the display to include R display areas when the touch screen is tapped simultaneously R times, and S display areas when the touch screen is tapped simultaneously T times followed by T simultaneous drags on the touch screen, followed by U simultaneous taps on the touch screen. R, S, T and U are integers, with R being a selected one of 2, 3 or 4, with S>R and T+U=S.

In one form of this aspect, T=3 and U>1.

Other features and advantages will become apparent from a review of the entire specification, including the appended claims and drawings.

BRIEF DESCRIPTION OF THE DRAWINGS

FIGS. 3a-3b are similar to FIGS. 2a-2b, but show changing the display to show three display areas;

DETAILED DESCRIPTION

Figure 1:
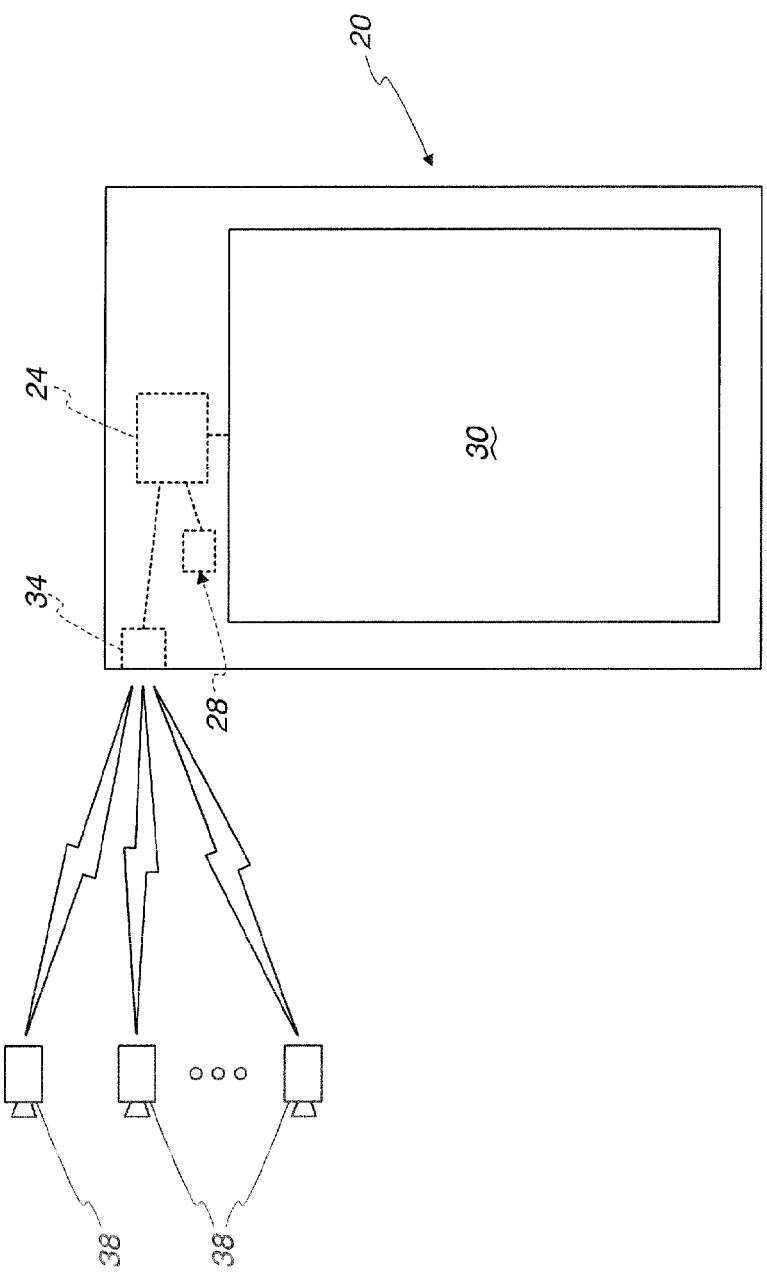
FIG. 1 is a schematic illustration of a display device as described herein, as used in a security environment in which video feeds from multiple security cameras are available for display on the device.

Suitable display devices 20 operable according to the disclosure herein are shown in the Figures. Broadly, as illustrated in FIG. 1, the device 20 may include a microcontroller or microprocessor 24 and memory 28. The microcontroller 24 may suitably control what is shown on a display 30. The device 20 may also include a wireless receiver 34 which may receive, for example, video signals from a plurality of remote cameras 38.

It should be appreciated that the details of the display device 20 may vary from that shown in FIG. 1 while still embodying one or more features of the disclosure. For example, the microprocessor 24 could be preprogrammed and/or the memory 28 could be integral with the microprocessor 24. Further, the information which is shown on the display 30 need not be video signals, nor need it be received wirelessly or even remotely. The device and/or method may be particularly advantageously used in security settings where the mobility of wireless communication is desired, and the embodiment particularly described below relates to such an environment. However, it should be appreciated that the device and method, relating to the ability to quickly and easily change the number of display areas shown in a display 30, may be advantageously used in many other applications with many types of data and information, including those in which multiple displays are initiated locally in the microprocessor 24.

Figure 2A:
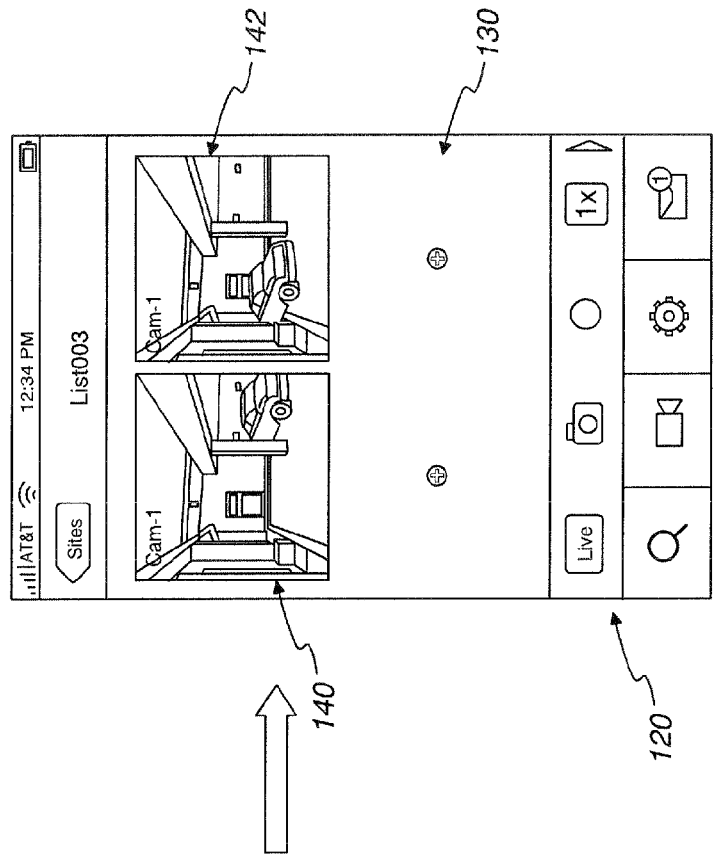
FIGS. 2a-2b illustrate operation of a display device as described herein to change the display to show two display areas for two video feeds.

In accordance with an advantageous use of the device and method, a display device 120 such as described generally in FIG. 1, with a touch screen display 130 (such as a smart phone, e.g., an iPhone), is in communication with a plurality of security cameras 38 is shown in FIGS. 2a to 4b, with the video signal from only one of the cameras 38 being shown in the touch screen display 130 in FIG. 2a. It should also be appreciated that the display device could support multi-touch (such as Apple's Magic Track Pad), and could also be used with any touch-responsive platform (including Apple iPads and computers using touch-pads). Further, it could be used with devices using any video editing software (e.g., Adobe Premier pro, iMovie, etc.).

Figure 2B:
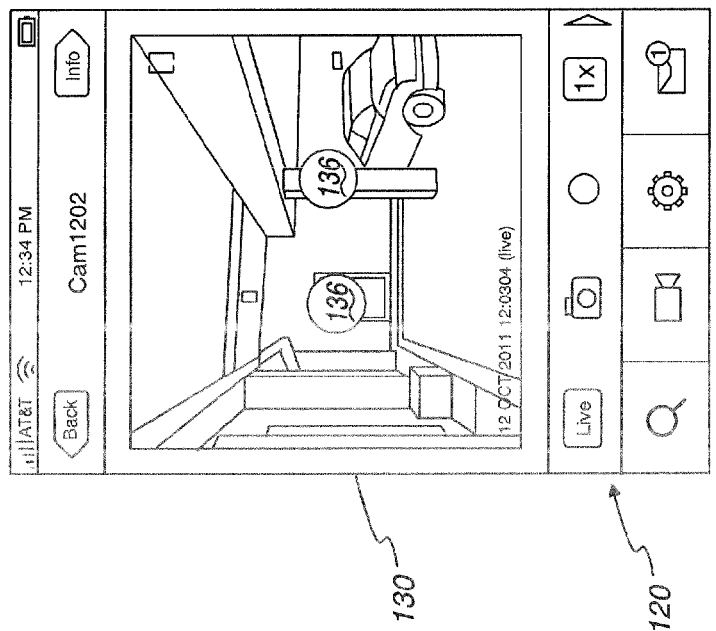

If the user wishes to have a display mode in which the video signal from two cameras instead of just one as in FIG. 2a is shown, he simultaneously taps the touch screen 130 twice (i.e., taps the screen 130 with two fingers at the same time, as represented by the two circles 136 in FIG. 2a). When he does that, the microprocessor 24 is caused to change the display 130 to a view in which two different areas 140, 142 are shown (as illustrated in FIG. 2b) in which, for example, video feeds from two different cameras 38 may be displayed.

It should be appreciated that which video feeds are shown in each area 140, 142 may be selected in virtually any manner in accordance with disclosure herein. For example, the selection may be preprogrammed (for example, video feeds from two specific, pre-selected cameras may be automatically shown in the two display areas 140, 142), or a rolling progression of feeds from different cameras may be shown, or video feeds from specific cameras focused on an area in which an alarm signal has been received may be shown in the display areas 140, 142. Further, the video feeds may be changed in a display mode with the user simply choosing a different video feed for a specific display area through use of an appropriate menu.

In FIG. 3a, like FIG. 2a, the display 130 has a single display area for the video feed from one camera 38. If the user wishes to display the video signal from three cameras, he may simultaneously tap the touch screen 130 three times (i.e., taps the screen 130 with three fingers at the same time as represented by the three circles 136 in FIG. 3a). When he does that, the display 130 changes to a view in which three different areas 140, 142, 144 are shown (as illustrated in FIG. 3b) in which, for example, video feeds from three different cameras 38 may be displayed.

Figure 4B:
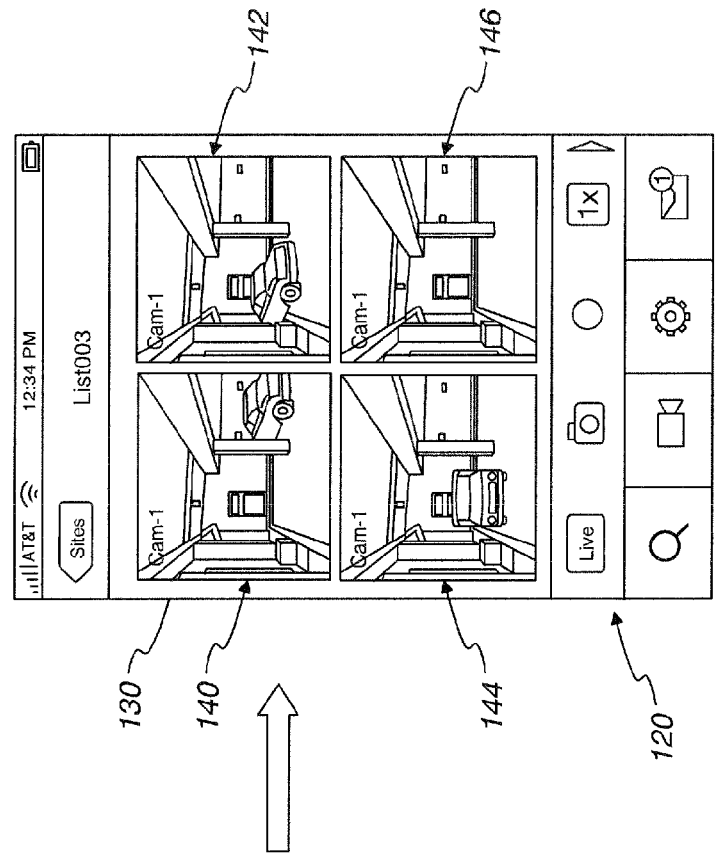
FIGS. 4a-4b are similar to FIGS. 2a-2b and 3a-3b, but show changing the display to show four display areas.
Figure 4A:
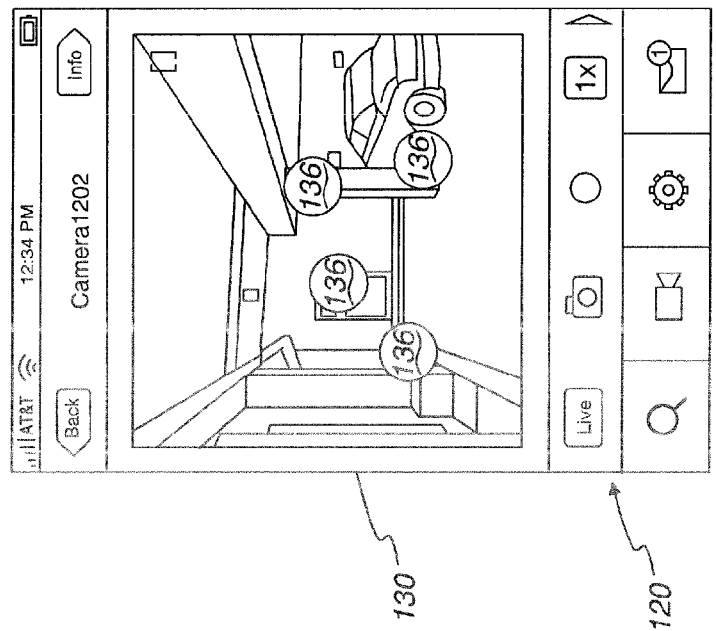

In FIG. 4a, like FIGS. 2a and 3a, the display 130 has a single display area for the video feed from one camera 38. If the user wishes to display the video signal from four cameras, he may simultaneously tap the touch screen 130 four times (i.e., taps the screen 130 with four fingers at the same time as represented by the four circles 136 in FIG. 4a). When he does that, the display 130 changes to a view in which four different areas 140, 142, 144, 146 are shown (as illustrated in FIG. 4b) in which, for example, video feeds from four different cameras 38 may be displayed.

It should be appreciated that the above described operations (tapping the touch screen display 130 with the number of fingers representing the number of display areas 140-146 desired) may be accomplished in any display mode (e.g., tapping the screen of FIG. 2a with four fingers simultaneously could be used to change from a display with two display areas 140, 142 to a display with four display areas 140, 142, 144, 146, or vice versa).

Further, it should be appreciated that the display mode may be changed to a single display area (as in FIGS. 2a, 3a and 4a) by another distinct operation. Advantageously, a double single tap (i.e., tapping one finger twice in a short period of time) may be used to change the display mode to a single display area. Such an operation is sufficiently intuitive that it will be easily remembered by any user, even when hurried or under stress, and advantageously will not risk being confused for another command or operation (since single touches are widely used for many operations with the single touch being different depending on precisely where on the touch screen 130 the touch occurs. Such operation may be accomplished from any screen (e.g., from display modes with two, three or four display areas 140-146 such as in FIGS. 2b, 3b and 4b).

It should be appreciated that the above described advantageously operating display device 120 may be of a relatively small size, wherein four separate display areas 140-146 may be the maximum which would be desired to enable the user to adequately see sufficient detail of what is displayed in each area. It should, however, be appreciated that display devices could operate according to the disclosure herein to allow more than four display areas to be shown simultaneously. Advantageously that may be accomplished, for example, with tablet devices 220 (such as iPads) wherein the display 230 may be sufficiently large to easily accommodate more than four display areas. In accordance with the disclosure herein, switching to views having more than four views may be accomplished by a similar operation as described in connection with switching to two to four display areas but with an initial step or key.

Figure 5A:
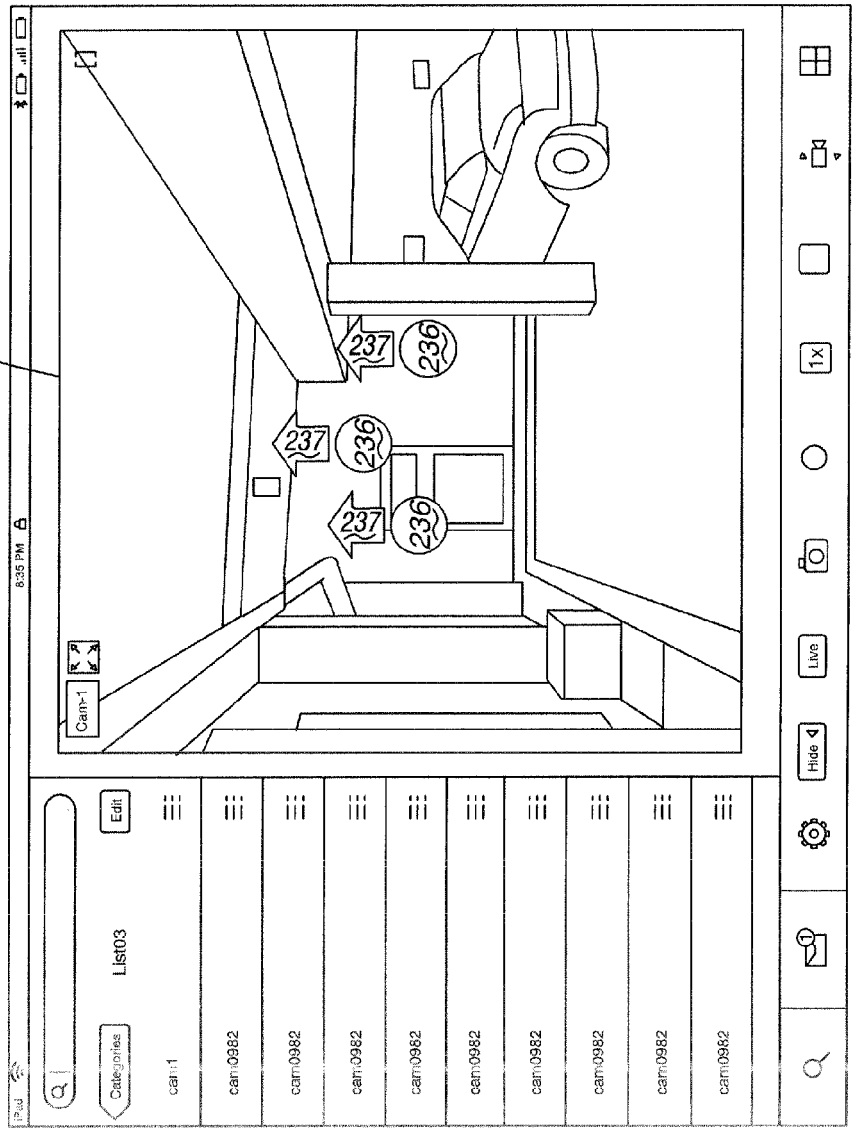
FIGS. 5a-5c illustrate operation of another display device as described herein to change the display to show seven display areas.
Figure 5B:
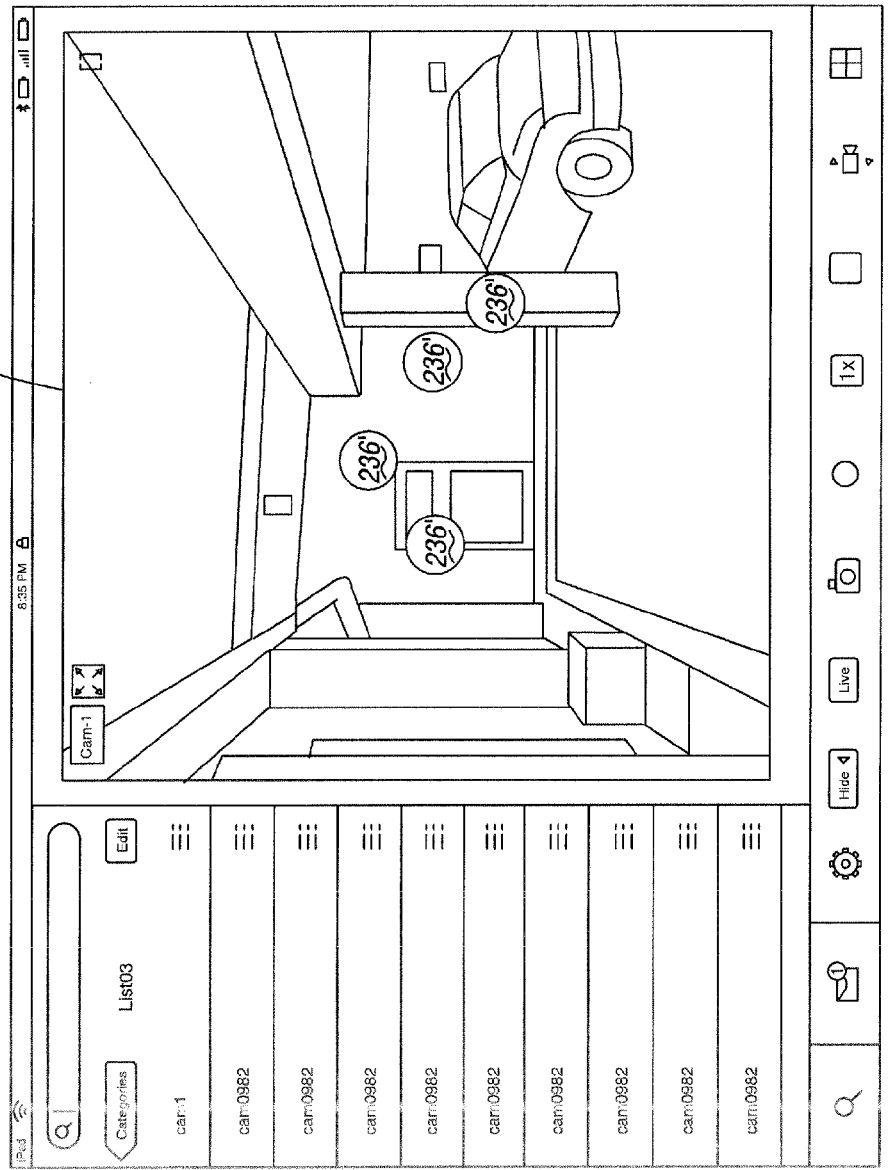
Figure 5C:
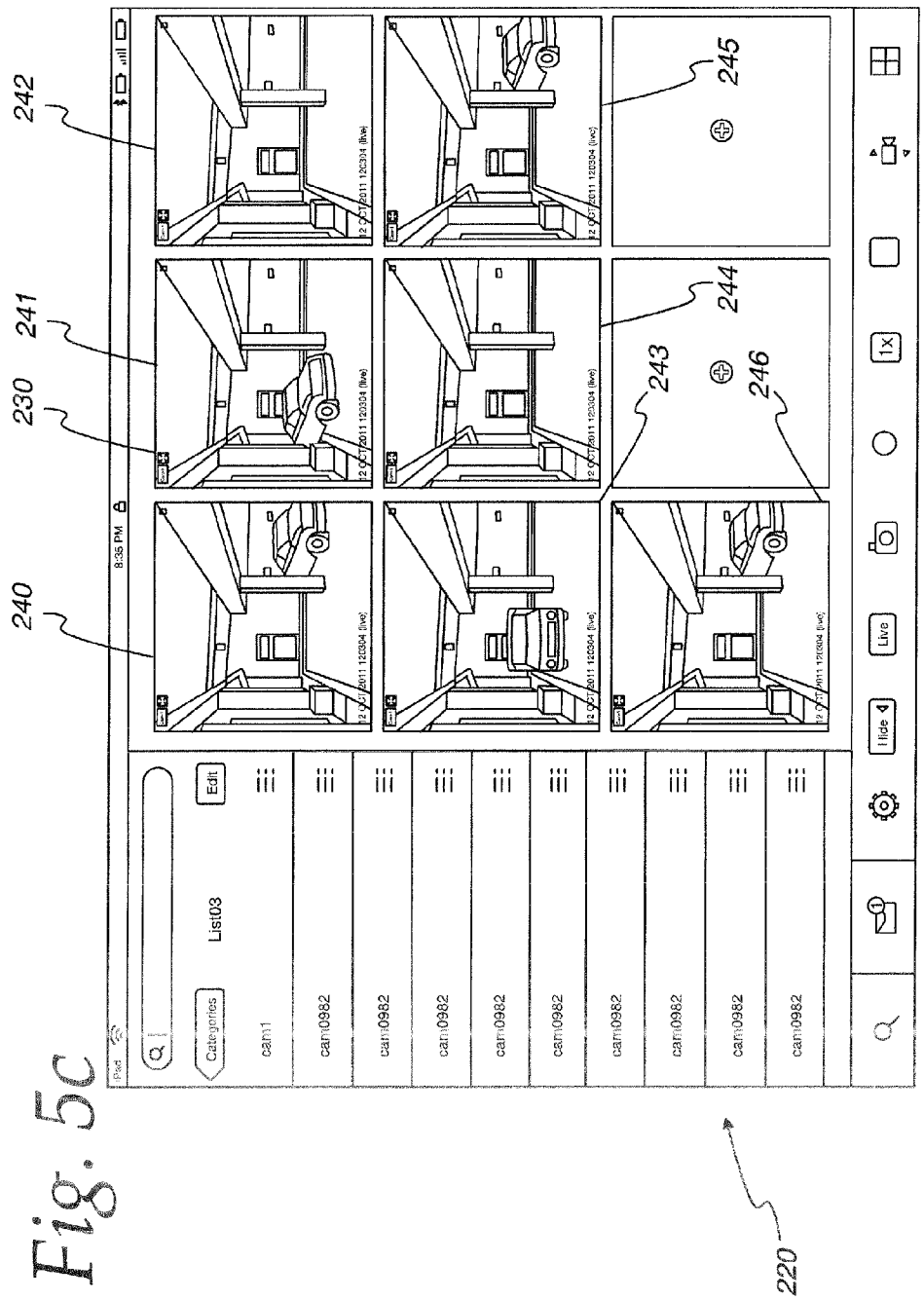

That is, the tablet device 220 shown in FIGS. 5a-5c may be operated as described above so that, for example, tapping the display 230 simultaneously with four fingers would cause the display 230 to show four display areas. However, if more than four display areas were desired, the user would first simultaneously tap the touch screen display 230 with three fingers (see circles 236 in FIG. 5a) and then drag those three fingers up on the screen (see arrows 237 in FIG. 5a). The tablet device 220 would recognize that such an operation (with the dragging) does not mean to show three display areas but instead is an initial key to be completed with a following step. After that initial step, the user would simultaneously tap the display 230 with a selected number of fingers (see circles 236' in FIG. 5b) to display the selected number of display areas 240-246 as shown in FIG. 5c.

Advantageously, in accordance with the disclosure herein, the combination of the number of fingers in the two steps can be the number of display areas 240-246 to show on the display 230. Thus, in the example illustrated in FIGS. 5a-5c, touching and dragging three fingers followed by tapping four fingers would cause the tablet device 220 to show seven display areas 240-246 as illustrated in FIG. 5c, making the selection of display areas 240-246 as intuitive as when selecting two, three or four screens.

It should be appreciated that while in many configurations, the display areas would be the same size as illustrated, it would be within the scope of the disclosure herein to provide display areas of different size. For example, in the display 230 illustrated in FIG. 5c, if five display areas were selected (e.g., by tapping and dragging three fingers then tapping two fingers), one of the display areas could be the size of four areas shown in FIG. 5c.

Moreover, it should be appreciated that display devices having touch screen displays can be intuitively and easily controlled by a user to show a selected number of display screens. Still further, such changing can be accomplished without requiring close attention of the user (a user could operate such devices to change the number of display areas without even looking at the screen), such operation being particularly advantageous for persons such as security guards who might be distracted, under stress and/or in a hurry.

Although a few embodiments have been described in detail above, other modifications are possible. For example, the device may be used in numerous applications in which numeric inputs are desired for various scenarios. Further, the steps of operation of the devices disclosed could be in different orders while still achieving desirable results. Still further, other components may be added to, or removed from, the described devices. Other embodiments may be within the scope of the following claims.

The invention claimed is:

1. A display device, comprising:
   a processor for running a program responsive to a numeric input;
   a display having a touch screen; and
   a controller for controlling said display to show output from said program, wherein:
      the program runs according to one numeric input responsive to two simultaneous taps on said touch screen,
      the program runs according to a second numeric input responsive to three simultaneous taps on said touch screen,
      the program runs according to a third numeric input responsive to four simultaneous taps on said touch screen, and
      the program generates a display of information from a plurality of sources, with the number of sources displayed corresponding to the numeric input.

2. A display device, comprising:
   a processor for running a program generating a display of information from a plurality of sources;
   a display having a touch screen; and
   a controller for controlling said display to simultaneously provide a selected number of display areas in said display, each of said display areas for displaying information from said information sources, wherein:
      the controller provides two display areas to said display responsive to two simultaneous taps on said touch screen,
      the controller, provides three display areas to said display responsive to three simultaneous taps on said touch screen, and
      the controller provides four display areas to said display responsive to four simultaneous taps on said touch screen.

3. The display device of claim 2, wherein each of said taps comprise a digit of a display device user contacting said touch screen.

4. The display device of claim 2, wherein said controller controls said touch screen to provide a single display area for one of said information sources responsive to two consecutive single taps on said touch screen, said single display area being the only display area for any of said information sources in said display.

5. The display device of claim 2, wherein said controller controls said touch screen to provide X display areas responsive to Y simultaneous taps on said touch screen, followed by Y simultaneous drags on said touch screen, followed by Z simultaneous taps on said touch screen, where X=Y+Z.

6. The display device of claim 5, wherein Y=3.

7. The display device of claim 2, wherein said information sources are security cameras and said information is video from said cameras.

8. The display device of claim 7, wherein said controller, provides video from selected cameras to said display.

9. A display device, comprising:
   a display having a touch screen; and a controller for controlling said display to simultaneously provide a selected number of display areas in said display, each of said display areas for displaying information from information sources, wherein said controller controls the display to include
R display areas when the touch screen is tapped simultaneously R times, and
S display areas when the touch screen is tapped simultaneously T times followed by T simultaneous drags on said touch screen, followed by U simultaneous taps on said touch screen,
wherein R, S, T and U are integers, R is a selected one of 2, 3 or 4, and S>R.

10. The display device of claim 9, wherein T+U>R.
11. The display device of claim 10, wherein T+U=S.
12. The display device of claim 11, wherein T=3 and U>1.
13. The display device of claim 9, wherein said information sources are security cameras and said information is video from said cameras.
14. The display device of claim 13, wherein said controller provides video from selected cameras to said display.
15. A display device, comprising:
a display having a touch screen; and
a controller for controlling said display to simultaneously provide a selected number of display areas in said display, each of said display areas for displaying video from a selected one of a plurality of remote security cameras, wherein said controller controls the display to include
R display areas when the touch screen is tapped simultaneously R times, and
S display areas when the touch screen is tapped simultaneously T times followed by T simultaneous drags on said touch screen, followed by U simultaneous taps on said touch screen,
wherein
R, S, T and U are integers, with R being a selected one of 2, 3 or 4,
S>R, and
T+U=S.
16. The display device of claim 15, wherein T=3 and U>1.

* * * * *